Dec. 25, 1928.  1,696,287
A. SOMMARIPA ET AL
MACHINE FOR INSPECTING AND BUNDLING CLOTH
Filed April 17, 1926   6 Sheets-Sheet 1
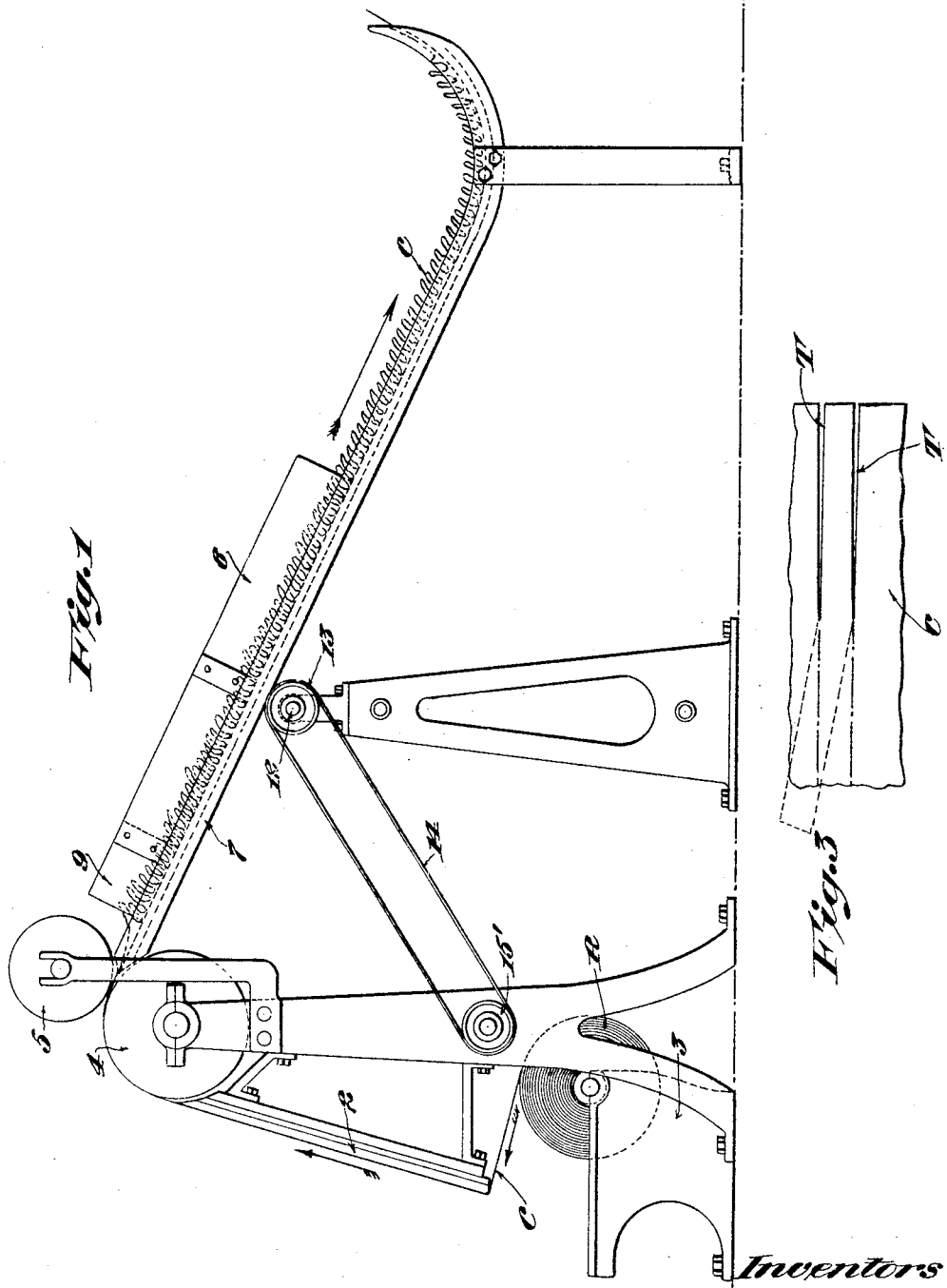

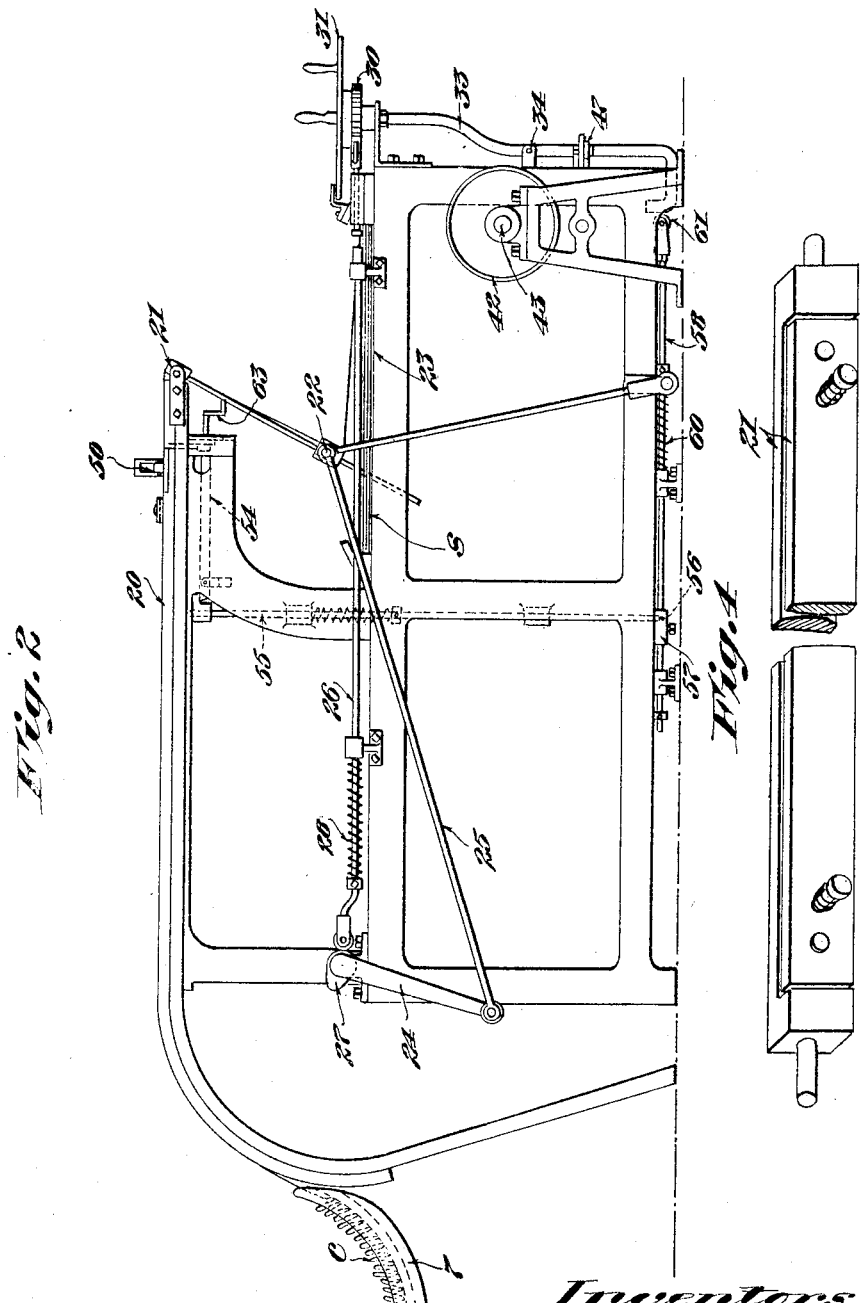

Dec. 25, 1928.
1,696,287

A. SOMMARIPA ET AL

MACHINE FOR INSPECTING AND BUNDLING CLOTH

Filed April 17, 1926
6 Sheets-Sheet 3

Inventors
Alexis Sommaripa
Louis G. Roberts
by J. H. McCrady
their Attorney.

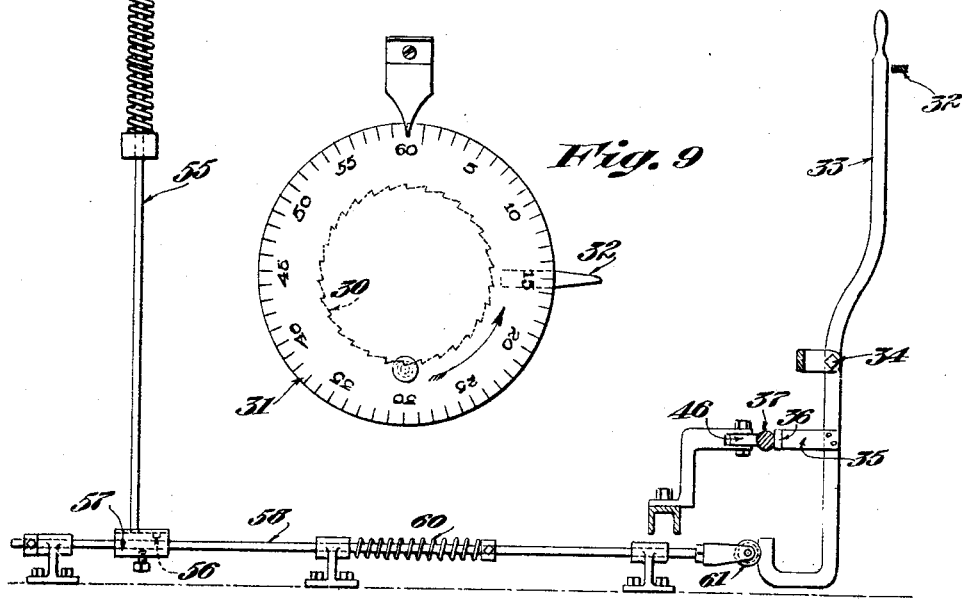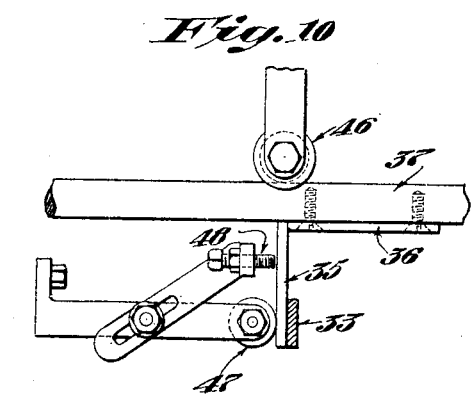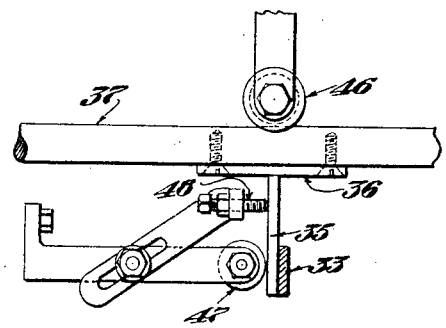

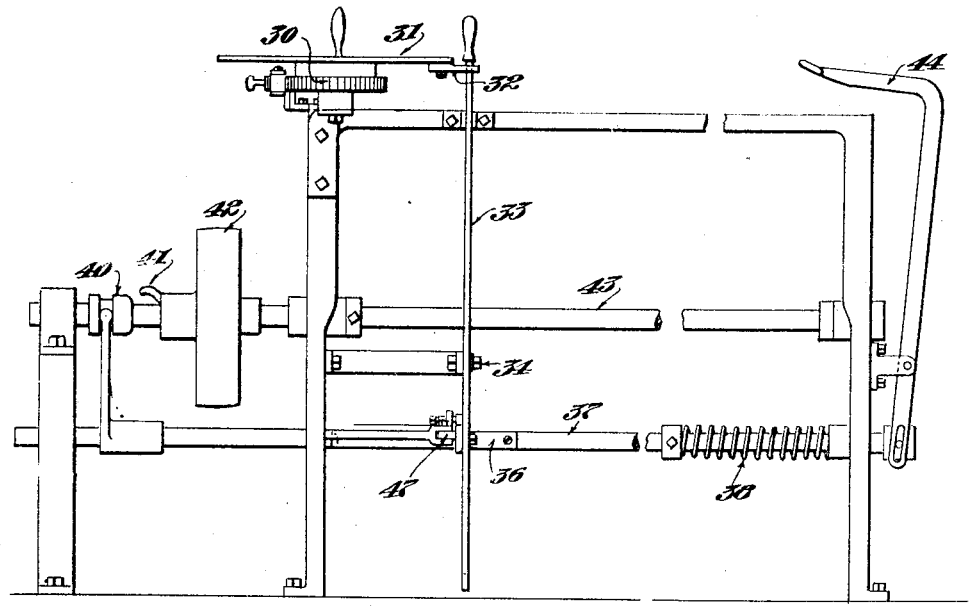
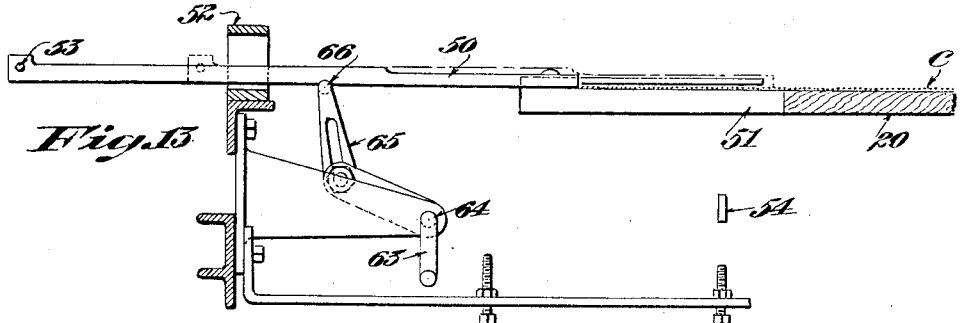
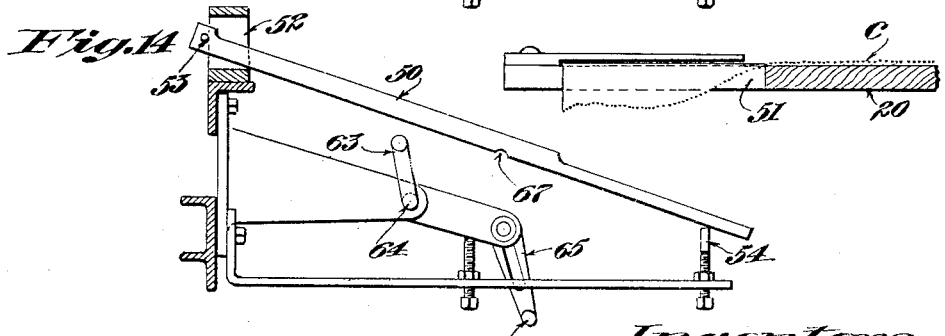

Dec. 25, 1928.
1,696,287
A. SOMMARIPA ET AL
MACHINE FOR INSPECTING AND BUNDLING CLOTH
Filed April 17, 1926
6 Sheets-Sheet 6
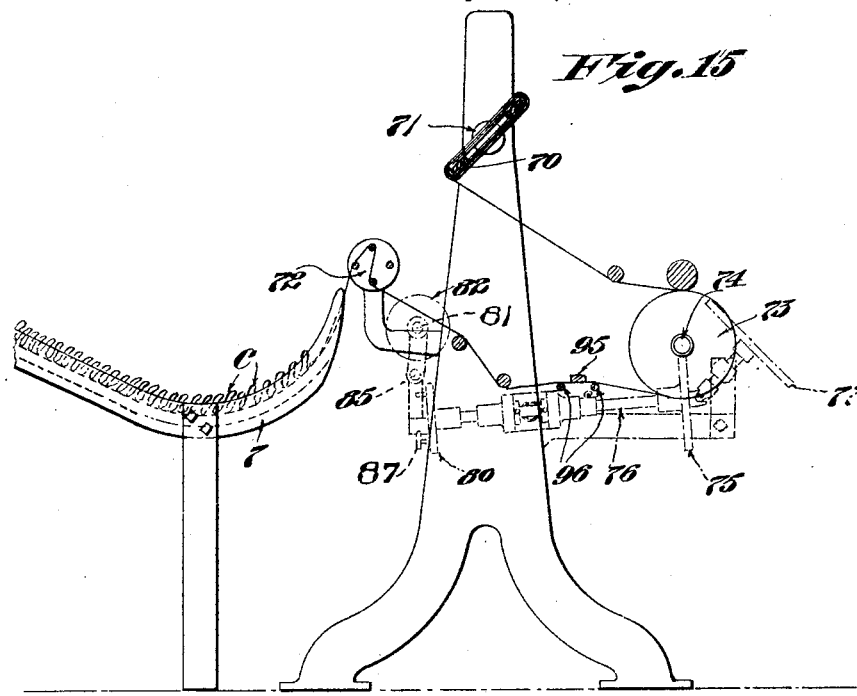
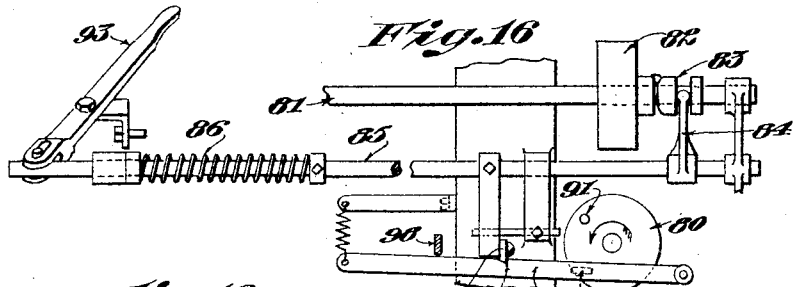
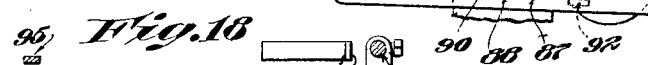
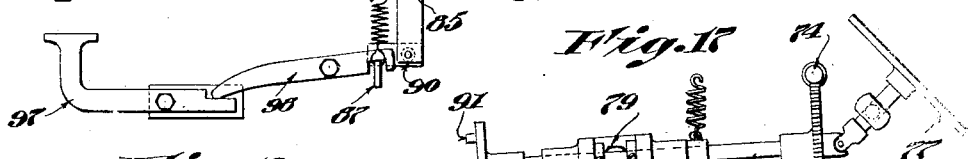
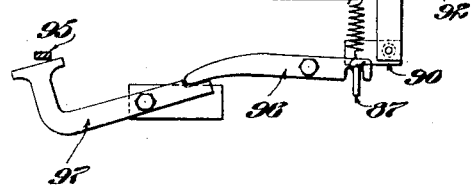

Patented Dec. 25, 1928.

1,696,287

UNITED STATES PATENT OFFICE.

ALEXIS SOMMARIPA, OF BUFFALO, NEW YORK, AND LOUIS G. ROBERTS, OF NASHUA, NEW HAMPSHIRE.

MACHINE FOR INSPECTING AND BUNDLING CLOTH.

Application filed April 17, 1926. Serial No. 102,802.

It is the usual custom in textile mills to inspect cloth after the manufacturing operations on it have been completed. This inspecting operation usually is performed in an inspection stand designed especially for this purpose, such a stand usually including mechanism for winding the inspected cloth into the form of a large roll. These rolls are next transferred to a machine which winds or folds the web into bundles or packages of suitable size for commercial distribution. In some cases the web of cloth is simply wound on a cloth board, in other cases it is doubled before being wound, while in other instances it is folded at intervals of one yard or some other definite length. In any event, a substantially predetermined length of cloth goes into each bundle or package.

It has been proposed heretofore to combine the inspecting and bundling operations and to perform both operations in the machine which winds, yards, or otherwise acts on the web to bundle the cloth. This expedient, however, has proved unsatisfactory for the reason that the speed at which the bundling machine operates is too great for accurate inspection. Furthermore, an interruption made either by the inspector or by the machine operator necessarily interrupts the other operation so that the combined production of the operator and inspector is reduced.

The present invention has for its chief object to devise a machine in which the inspecting and bundling operations will be combined, which will permit each operation to proceed at a rate suited to it, and which will result in economies in the labor required in performing these operations.

The invention involves both a novel organization of mechanisms and also improvements in the mechanism which performs the bundling operation and which reduces the attention required by an attendant in performing this operation.

The nature of the invention will be readily understood from the following description when read in connection with the accompanying drawings, and the novel features will be particularly pointed out in the appended claims.

In the drawings,

Figure 1 is a side elevation of one section of a machine embodying this invention;

Fig. 2 is a side elevation of another section of said machine;

Fig. 3 is a plan view showing the way in which the web of cloth preferably is slotted or slit for the operation of the feeler;

Fig. 4 is a perspective view of a cloth tensioning device which may be used in the mechanism shown in Fig. 2;

Fig. 8 is a front skeleton view, partly in cross-section, of the stopping mechanism for the bundling machine;

Fig. 9 is a plan view of the disk of the measuring mechanism of the machine shown in Fig. 2;

Fig. 10 is a plan view, partly in cross-section, showing a portion of the stopping mechanism for the machine;

Fig. 11 is a view similar to Fig. 10 showing the parts in their stopped position;

Fig. 12 is a front skeleton view of additional parts of the stopping mechanism for the apparatus shown in Fig. 2;

Fig. 13 is a vertical cross-sectional view, partly in elevation, of the feeler which engages the web of cloth, showing this feeler in its normal or running position;

Fig. 14 is a view similar to Fig. 13 showing the feeler in its stopping position;

Fig. 15 is a side elevation, partly in cross-section, of a different form of bundling mechanism embodying certain features of this invention;

Fig. 16 is a rear skeleton view of parts of the stopping means for this mechanism;

Fig. 17 is a side elevation, partly in cross-section, showing parts of the measuring mechanism of the machine shown in Fig. 15;

Fig. 18 is a side elevation of part of the stopping mechanism for the machine shown in Fig. 15 but showing the parts in running position; and Fig. 19 is a view similar to Fig. 18 but showing the parts in position to stop the machine.

Referring first to Figs. 1 and 2, the machine there shown comprises an inspection stand which includes an inclined inspection table 2 and brackets, one of which is shown at 3, for supporting the shaft or arbor on which a roll of cloth R is wound. This roll is positioned below the table 2, and the web of cloth C is unwound from it and passes upwardly across the table 2 and between the bites of rolls 4 and 5 which are mounted at the upper end of the stand. The lower of these rolls is driven from any convenient source of power and it feeds the cloth across the inspection table. The inspector sits in front of this table and watches the moving web of cloth for the purpose of detecting any flaws or imperfections in the goods. When she detects a flaw she simply stops the machine and marks the defective portion in some appropriate way. This inspection stand is very similar to those commonly used heretofore and such stands customarily are equipped with a stopping machine usually including a pedal by means of which an inspector can operate said mechanism to stop the feeding of the cloth very quickly.

Instead of delivering the inspected cloth to a mechanism which winds this cloth on an arbor, as has been customary heretofore, the cloth is delivered to the upper end of an inclined rack or scray 7. The cloth naturally assumes the form of loose folds and it slides down the scray by gravity until it reaches the lower or right-hand end, Fig. 1, this end of the scray being turned upwardly far enough to prevent the cloth from sliding off the scray.

Figure 5:
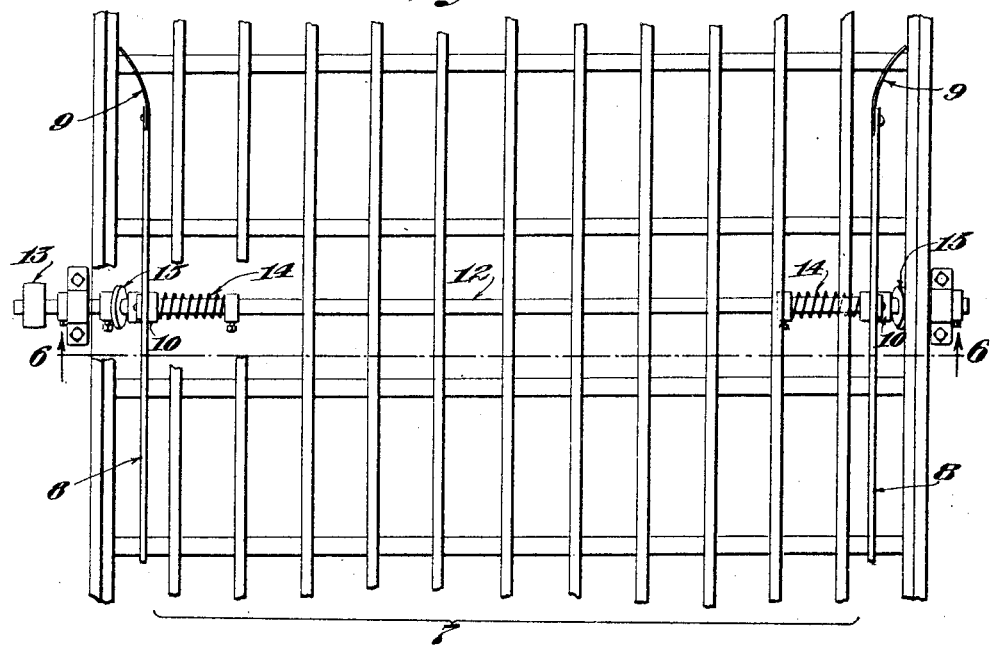
Fig. 5 is a plan view of a part of the scray and mechanism associated therewith.
Figure 6:
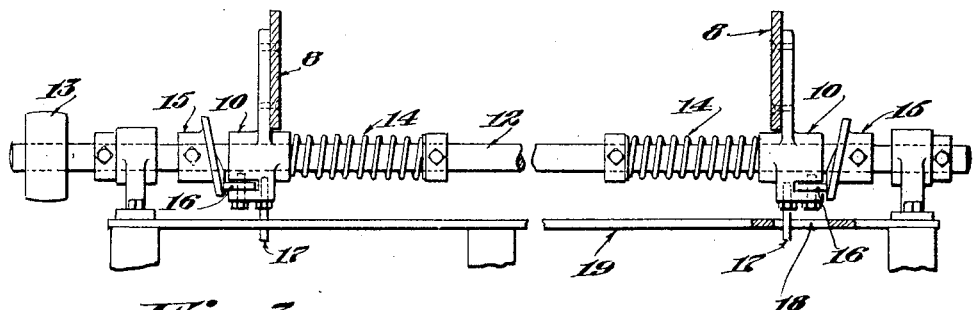
Fig. 6 is a cross-sectional view substantially on the line 6—6, Fig. 5.
Figure 7:
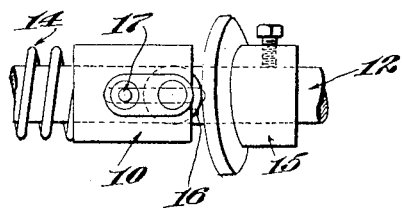
Fig. 7 is a bottom view of a part of the driven mechanism for centering or laterally guiding the web of cloth as it travels over the scray.

As the cloth slides down the scray it is guided, as to elevation, by the bottom members of the scray. In order to guide it laterally a driven mechanism preferably is used, the construction of which is best shown in Figs. 1, 5, 6 and 7. This mechanism comprises two upright side pieces or guides 8—8 near opposite sides of the scray, each provided at its upper end with an outwardly curved plate 9. The side pieces are secured rigidly on brackets 10—10, both of which are loosely mounted on a shaft 12 which extends horizontally across and just below the scray. A pulley 13 is mounted on this shaft and is connected by a belt 14 to a driving pulley 15', Fig. 1, on the inspection stand. The two guide plates 8—8 are forced apart, or away from each other, by springs 14—14, Fig. 6, and they are forced toward each other by cams 15—15 secured rigidly but adjustably on the shaft 12. In the construction shown each bracket 10 is provided with a small wheel or roll 16 which runs against the cam face of its cooperating cam member 15. Guide pins 17—17 project from the lower side of the bracket 10 into slots, one of which is shown at 18, Fig. 6, formed in a stationary bar 19 which lies immediately under the shaft 12, so that any tendency of the brackets 10 to rotate or tip about the axis of the shaft 12 is effectually resisted.

It will now be evident that when the shaft 12 is rotated, the cams 15 and springs 14 will give the guiding members 8—8 a short reciprocating movement toward and from each other. These members will engage the opposite edges of the web of cloth C and guide it laterally as it slides down the scray. At the same time the vibratory movement facilitates the feeding movement of the cloth over the surface of the scray.

Instead of having the two cams 15—15 set in opposed relationship, as shown, one of these cams can be rotated through an angle of 180° with reference to the shaft 12 and locked in the latter position, in which case the cams and springs then will move the two guides 8—8 in unison, first toward one side of the scray and then toward the opposite side. In either event the cloth is properly guided laterally on the scray.

The web of cloth is taken substantially continuously from the discharge end of the scray by a bundling mechanism which may be of any desired type. The mechanism shown in Fig. 2 is designed to fold the web of cloth in flat superposed folds, each fold containing a yard, or any other desired length of cloth. This folding mechanism may be of a type commonly used in this industry and need not be described in detail. The cloth is fed along a guideway 20, Fig. 2, through a tension device 21, Figs. 2 and 4, at the end of this guideway to a folder 22 which swings forward and backward across a horizontal table 23 and folds the web of cloth. As this action continues a stack S, Fig. 2, is formed. This folder is driven by an arm 24, secured to a horizontal shaft at the left-hand end, Fig. 2, of the machine, and connected to the folder by a rod 25.

It is usual to equip a machine of this type with an automatic "knock-off" mechanism for stopping the machine when a predetermined length of fabric has been folded or "yarded". This mechanism comprises a reciprocating rod 26 extending from the front to the rear of the machine and arranged to be moved forward by a cam 27 and rearwardly by a spring 28. On its forward movement it operates a pawl which actuates a ratchet wheel 30, Figs. 2, 9 and 13. A dial 31 revolves with this wheel and indicates the number of yards in the stack S made by the folder. When the desired length of cloth for a given bundle has been folded, a finger 32 which projects from the measuring dial 31, strikes the upper part of a lever 33 which is fulcrumed on the machine frame at 34 and swings the lower part of this lever forward or toward the right, Fig. 8. A latch 35, Figs. 8, 10 and 11, is secured rigidly to the lever 33 and normally engages with the left-hand end, Fig. 10, of a plate 36 which is secured rigidly to the clutch operating rod 37. A strong spring 38, Fig. 12, coiled about this rod tends to force the rod toward the left, Figs 10, 11 and 12, and thus to slide the clutch operating member 40, Fig. 12, out of engagement with the clutch member 41, (which is of a common type), and thereby to permit the pulley 42 which carries the clutch mechanism to rotate freely on the main shaft 43 of the machine. This movement of the clutch operating member 37 normally is restrained, however, by the latch 35. When the finger 32 operates the lever 33, as above described, the latch 35 is withdrawn and the spring 38 then moves the rod 37 toward the left, Figs 10, 11 and 12, and shifts the parts into the positions shown in Fig. 12 with the clutch in its "out" or off position. This results in stopping the machine.

In order to start the machine again the operator moves the lever 44, Fig. 12, toward the left, thus sliding the rod 37 toward the right and bringing the clutch part 40 into operative engagement with its cooperating part 41, and permitting the latch 35 to move by gravity in behind the plate 36, as shown in Fig. 10, where it will hold the clutch in its running position. It will be understood, of course, that before the operator starts the machine up, as just described, he will reset the dial 31 in readiness for the building of the next bundle of cloth.

A roll 46, Figs. 8, 10 and 11, backs up the rod 37 immediately opposite the latch 35, and another roll 47 and an adjustable stop 48 support the latch laterally against the pressure exerted thereon by the clutch operating rod 37.

The mechanism just described stops the bundling operation when a predetermined length of cloth has been folded. The present invention provides means which cooperate with certain parts of the mechanism above described to stop the bundling operation automatically at a defective point in the goods. For this purpose the machine is provided with a feeler, and the cloth inspector slits the cloth, or performs some equivalent operation which will enable the feeler to detect the defective point in the goods. Preferably the inspector simply cuts a slit in the margin of the fabric at the front and rear of the defective point in the goods. Such slits are indicated in Fig. 3 at T—T. The feeler provided to detect this split is best shown at 50 in Figs. 13 and 14. It comprises a metal bar, the forward or left-hand end of which, Figs. 13 and 14, rests on the margin of the web C of cloth as the cloth is fed over the guide or support 20 of the bundling machine. The support is cut away or slotted, as shown at 51, immediately under the feeler. The rearward or left-hand end of the feeler is positioned in a narrow slot provided in a stationary bracket 52 which permits the feeler to drop but supports it against being swung forward by its contact with the cloth. Fig. 13 shows the feeler in dotted lines in its running position.

When a slit such as that shown at T, Fig. 3, comes under the feeler, the feeler drops through this slit in the fabric and through the slot 51 in the support 20 into approximately the position shown in Fig. 14. A pin 53 extending transversely through the left-hand end of the feeler prevents it from sliding out of the bracket 52. During this movement the feeler drops upon a lever 54, Figs. 2, 8, 13 and 14, thus moving the opposite end of this lever upwardly and causing it to lift an upright rod 55, the lower end of which normally rests in a notch 56, Figs. 2 and 8, formed in a sleeve 57 which is rigidly secured to a horizontal rod 58. A spring 60 encircling this rod tends to move it toward the right, Figs. 2 and 8, but such movement normally is prevented by the engagement of the rod 55 in the notch 56. As soon as the rod 55 is lifted, however, by the dropping of the feeler the spring 60 immediately slides the rod 58 to the right, and a roll 61 on the right-hand end of this rod engages the lower end of the lever 33 and swings the lever far enough to trip the latch 35. This results in stopping the machine in the manner above described.

The machine operator next tears out the defective piece of goods between the two slits T—T and starts the machine up again. In doing this he draws the cloth forward so that the web then overlies the feeler 50. In order to reset the feeler it is necessary to move the feeler around the margin of the web of fabric. For this purpose a short crank 63, Figs. 2, 13 and 14, is provided within convenient reach of the workman, and this crank is connected through a short shaft 54 to another crank 65 having a pin 66 in its end. Referring to Fig. 14 it will be seen that when the crank 63 is rotated in a counter-clockwise direction, the pin 66 will enter the notch 67 in the lower side of the feeler and carry this feeler upwardly and toward the left into approximately the position shown in full lines in Fig. 13. By then turning the crank 63 in a clockwise direction the feeler 50 will be moved forward over the fabric into approximately the dotted line position, Fig. 13. This resets the feeler in its operative or running position, and the machine is then ready to start. This is done by pulling backwardly on the handle of the lever 33, thus forcing the rod 58 toward the rear of the machine and thereby re-engaging the lower end of the rod 55 in the notch 56.

It will now be understood that the bundling mechanism, so long as it is running, requires no attention on the part of the operator. His services are required only in case the machine has been stopped, either by the measuring knock-off, or by the feeler operated mechanism. One operator, therefore, can tend at least two machines.

The cloth inspector pays no attention to the bundling machine, and her work is not interrupted by the stopping of the bundling machine, nor is it interfered with in any way by the fact that the goods are travelling continuously from her machine to the bundling machine. When she detects a defective section of goods she stops her machine, cuts slits in the margin at the front and rear of the defective portion, as above described, and then starts the machine into operation again. A considerable accumulation of cloth, say for example, two hundred (200) yards, is normally held in the scray between the inspection stand and the bundling machine so that the stopping of the inspection stand does not interfere with the operation of the bundling machine, since the machines are driven independently. That is, either machine may be stopped or started without interfering with the operation of the other machine. The delays in the operation of the bundling machine occasioned by the taking out of the cloth are more frequent and are somewhat longer than the interruptions in the operation of the inspection stand so that the fact that the cloth must be fed at a slower speed through the inspection stand than in the bundling machine, is compensated for in the course of a day's run, and the accumulation of goods between the two mechanisms gives the necessary "come and go" between the two machines to enable each to be operated at a speed suited to its own requirements. It has been determined in actual practice that the invention effects a very substantial saving in the inspecting and bundling operations.

Instead of using a yarding machine, any other machine adapted to make the desired "put up" of the goods may be used. Figs. 15 to 19 show an embodiment of certain features of the invention in which a winding machine is used instead of a folding or yarding machine. This machine includes a reel 70 revolving about the axis of the shaft 71. The web of cloth C is led from the discharge end of the scray 7 through a tension device 72, over and under suitable guide rolls to and around a sand roll 73, and thence to the reel 70. The sand roll is provided for the purpose of measuring the goods, and it is mounted on a shaft 74 having a worm section meshing with a worm wheel 75 fast on a shaft 76. A measuring dial 77 is connected with this shaft, and rotates in unison therewith. The shaft 76 is mounted in bearings supported in a yoke 78, Fig. 17, which is pivoted at 79, and the shaft carries a disk 80 at its rearward end. The driving shaft 81 of the machine carries a pulley 82 which is provided with a clutch similar to that with which the pulley 42, Fig. 12, is equipped. The cooperating clutch member 83 is moved backward and forward by a yoke 84 secured fast on a shaft 85 which is mounted horizontally at the back of the machine. A spring 86 tends to slide this shaft in a direction to throw the clutch out, but this movement is normally restrained by a latch 87, Fig. 16, having a notch 88 in which a detent or stop 90 is positioned, the detent being secured fast to the shaft 85. When a predetermined length of goods has been wound on the reel 70, a pin 91 on the disk 80 strikes a lug 92 on the latch 87 and releases the latch, thus allowing the spring 86 to throw the clutch out and thereby stop the machine. The clutch can be reset by operating the hand lever 93.

The machine also is equipped with a feeler 95 similar to the feeler 50, above described, and similarly mounted. This feeler engages the margin of the goods between two rolls 96—96, Fig. 15. When it drops, due to the arrival of a slit in the margin of the fabric, as previously described, it strikes a lever 97, Figs. 18 and 19, thus tipping this lever into the position shown in Fig. 19, and causes it to operate another lever 98 which engages the latch 87, above referred to, and releases the latch, thus stopping the machine.

The invention thus combines the cloth inspecting and bundling operations, eliminates any handling of the goods between the two operations, allows each operation to proceed at a suitable speed and reduces the labor involved in the bundling operation.

The invention may also be used in connection with other types of bundling machines and with other stop motions and different feeler arrangements. While, therefore, we have herein described embodiments of our invention which we at present prefer, it will be understood that the invention is not limited to embodiment in the forms shown.

Having thus described our invention, what we desire to claim as new is:

1. In a machine of the character described, the combination of a cloth inspection stand, a scray upon which the cloth is discharged from said stand and in which it accumulates, and mechanism for taking the cloth substantially continuously from said scray and bundling it, said inspection stand and mechanism being driven independently of each other whereby either may be stopped without interrupting the operation of the other.

2. In a machine of the character described, the combination of a cloth inspection stand, a bundling mechanism to which the cloth passes substantially continuously from said stand, and a scray between said stand and mechanism over which the cloth passes, said scray being operative to hold an accumulation of cloth and to feed the cloth by gravity toward said bundling mechanism, said inspection stand and mechanism being driven independently of each other whereby either may be stopped without interrupting the operation of the other.

3. In a machine of the character described, the combination of a cloth inspection stand, a scray upon which the cloth is discharged from said stand and in which it accumulates, mechanism for taking the cloth substantially continuously from said scray and bundling it, said inspection stand and said mechanism being driven independently of each other, and automatic means for stopping the operation of said bundling mechanism under predetermined conditions without interrupting the operation of said inspection stand.

4. In a machine of the character described, the combination of a cloth inspection stand, a scray upon which the cloth is discharged from said stand and in which it accumulates, driven means for guiding the cloth laterally on the scray, and mechanism for taking the cloth from said scray substantially continuously and bundling it, said scray being adapted to feed the cloth by gravity toward said bundling mechanism, and said inspection stand and said mechanism being driven independently of each other.

5. In a machine of the character described, the combination of a cloth inspection stand, a bundling mechanism to which the cloth passes substantially continuously from said stand, said inspection stand and said mechanism being driven independently of each other, and means between said stand and said mechanism for receiving the cloth from said inspection stand and from which it is taken by said bundling mechanism, said means serving to hold an accumulation of said cloth whereby it permits said inspection stand and bundling mechanism to be started, stopped and operated independently of each other.

6. In a machine of the character described, the combination of a cloth inspection stand including means for feeding a web of cloth past the inspecting point, means to which the cloth is fed from said inspection stand serving to hold an accumulation of said cloth, mechanism for taking the cloth from said means and bundling it, said inspection stand and said mechanism being driven independently of each other, and means for stopping the operation of said bundling mechanism automatically under predetermined conditions without interrupting the operation of said inspection stand.

7. In a machine of the character described, the combination of a cloth inspection stand including means for feeding a web of cloth past the inspection point, a scray upon which the cloth is discharged from said stand and in which it accumulates, mechanism for taking the cloth from said scray substantially continuously and bundling it, said inspection stand and said mechanism being driven independently of each other, said scray being adapted to feed the cloth by gravity toward said bundling mechanism, and means for stopping the operation of said bundling mechanism automatically under predetermined conditions without interrupting the feeding of the cloth through said inspection stand.

8. In a machine of the character described, the combination of a cloth inspection stand including means for feeding a web of cloth past the inspection point, a bundling machine to which the cloth passes from said stand, means between said stand and said machine for receiving the cloth from said inspection stand, and for holding an accumulation of said cloth between said stand and said machine, whereby it permits said inspection stand and said bundling machine to be started, stopped and operated independently of each other, a feeler in said machine arranged to bear against the web of cloth, whereby said feeler will be moved out of its normal position when it detects a slit in said web, and means arranged to operate automatically upon such movement of the feeler to stop the bundling machine.

9. In a machine of the character described, the combination of a cloth inspection stand including means for feeding a web of cloth past the inspection point, a bundling machine to which the cloth passes from said stand, means between said stand and said machine for receiving the cloth from said inspection stand and for holding an accumulation of said cloth between said stand and said machine, whereby it permits said inspection stand and said bundling machine to be started, stopped and operated independently of each other, a feeler arranged to bear against the web of cloth as it passes through said bundling machine, mechanism under the control of said feeler for stopping said machine automatically, and additional means for bringing said stopping mechanism into operation automatically when a predetermined length of cloth has been bundled.

10. In a machine of the character described, the combination of a cloth inspection stand including means for feeding a web of cloth past the inspection point, a bundling machine to which the cloth passes from said stand, means between said stand and said machine for receiving the cloth from said inspection stand and for holding an accumulation of said cloth between said stand and said machine, whereby it permits said inspection stand and said bundling machine to be started, stopped and operated independently of each other, a feeler arranged to bear against the web of cloth as it is fed through said bundling machine and operative to detect a slit in said web, and mechanism under the control of said feeler for stopping said machine automatically when the feeler detects a slit in said web, said feeler being mounted for resetting movement around the margin of said web.

11. In a machine of the character described, the combination of a cloth inspection stand including means for feeding a web of cloth past the inspection point, a bundling machine to which the cloth passes from said stand, means between said stand and said machine for receiving the cloth from said inspection stand and for holding an accumulation of said cloth between said stand and said machine, whereby it permits said inspection stand and said bundling machine to be started, stopped and operated independently of each other, a feeler arranged to bear against the web of cloth as it is fed through said bundling machine and operative to detect a slit in said web, mechanism under the control of said feeler for stopping said machine automatically when it detects a slit in said web, and means for moving said feeler around the margin of said web to restore it to its normal position after it has performed its slit detecting function.

In testimony whereof we have hereunto signed this specification.

ALEXIS SOMMARIPA.
LOUIS G. ROBERTS.